(12) United States Patent
Asano

(10) Patent No.: US 7,794,321 B2
(45) Date of Patent: Sep. 14, 2010

(54) VIDEO GAME PROCESSING APPARATUS, VIDEO GAME PROCESSING METHOD AND VIDEO GAME PROCESSING PROGRAM

(75) Inventor: Tomoya Asano, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 107 days.

(21) Appl. No.: 12/277,564

(22) Filed: Nov. 25, 2008

(65) Prior Publication Data

US 2009/0143137 A1      Jun. 4, 2009

(30) Foreign Application Priority Data

Nov. 30, 2007  (JP) .............................. 2007-310127

(51) Int. Cl.
*A63F 9/24* (2006.01)
(52) U.S. Cl. ...................................... 463/23
(58) Field of Classification Search .................... 463/23
See application file for complete search history.

(56) References Cited

U.S. PATENT DOCUMENTS

2002/0111216 A1   8/2002  Himoto et al.

2007/0066387 A1   3/2007  Matsuno et al.

FOREIGN PATENT DOCUMENTS

| EP | 1764752 A | 3/2007 |
|---|---|---|
| JP | 2002-78971 | 3/2002 |
| JP | 2002-078971 A | 3/2002 |
| JP | 2003-103053 | 4/2003 |
| JP | 2003-103053 A | 4/2003 |
| JP | 2006-345926 A | 12/2006 |
| JP | 2007-190203 | 8/2007 |

OTHER PUBLICATIONS

English language Abstract of JP 2002-078971 A (Mar. 19, 2002).
English language Abstract of JP 2003-103053 A Apr. 8, 2003).
English language Abstract of JP 2006-345926 A (Dec. 28, 2006).

*Primary Examiner*—John M Hotaling
*Assistant Examiner*—Werner Garner
(74) *Attorney, Agent, or Firm*—Greenblum & Bernstein, P.L.C.

(57) ABSTRACT

An on-line video game video game control server serves to read out a mini-game score information generated every player, in which three scores used for determining parameter of a summoned beast used for a main story in sub-game scores having no relation to a main story of the video game and a player who obtained that score are matched, and to renew a mini-game score information A of a player A by setting three scores in the score set in the mini-game score information A of the player A and a score set in a mini-game score information B of a player B.

5 Claims, 9 Drawing Sheets

Fig.2

Mini-game score information (player A)

| | Score (top3) | Player name |
|---|---|---|
| Mini-game "a" | 200 | Player A |
| | 180 | Player A |
| | 150 | Player B |
| Mini-game "b" | 190 | Player A |
| | 155 | Player A |
| | 80 | Player A |
| Mini-game "c" | 150 | Player A |
| | 120 | Player C |
| | 95 | Player C |
| Mini-game "d" | 120 | Player B |
| | 90 | Player A |
| | 75 | Player D |
| Mini-game "e" | 85 | Player A |
| | 65 | Player D |
| | 45 | Player D |

Fig.3

Summoned beast P parameter information(player A)

|  | Average of 3 high scores /100 | Corresponding parameter |
|---|---|---|
| Mini-game "a" | 1.77 | power |
| Mini-game "b" | 1.42 | physical power |
| Mini-game "c" | 1.22 | quickness |
| Mini-game "d" | 0.95 | intelligence |
| Mini-game "e" | 0.67 | spirit |

Fig.5

Mini-game score information(player B)

| | Score(top3) | Player name |
|---|---|---|
| Mini-game "a" | 190 | Player B |
| | 175 | Player B |
| | 145 | Player A |
| Mini-game "b" | 145 | Player B |
| | 120 | Player C |
| | 90 | Player C |
| Mini-game "c" | 100 | Player B |
| | 80 | Player C |
| | 75 | Player B |
| Mini-game "d" | 120 | Player B |
| | 95 | Player D |
| | 70 | Player A |
| Mini-game "e" | 50 | Player B |
| | 45 | Player B |
| | 20 | Player C |

Fig.6

Mini-game score information(player A after score mix)

| | Score(top3) | Player name |
|---|---|---|
| Mini-game "a" | 200 | Player A |
| | 190 | Player B |
| | 180 | Player A |
| Mini-game "b" | 190 | Player A |
| | 155 | Player A |
| | 145 | Player B |
| Mini-game "c" | 150 | Player A |
| | 120 | Player C |
| | 100 | Player B |
| Mini-game "d" | 120 | Player B |
| | 90 | Player A |
| | 75 | Player D |
| Mini-game "e" | 85 | Player A |
| | 65 | Player D |
| | 50 | Player B |

Fig.7

Mini-game score information(player B after score mix)

| | Score(top3) | Player name |
|---|---|---|
| Mini-game "a" | 200 | Player A |
| | 190 | Player B |
| | 180 | Player A |
| Mini-game "b" | 190 | Player A |
| | 155 | Player A |
| | 145 | Player B |
| Mini-game "c" | 150 | Player A |
| | 100 | Player B |
| | 80 | Player C |
| Mini-game "d" | 120 | Player B |
| | 90 | Player A |
| | 70 | Player A |
| Mini-game "e" | 85 | Player A |
| | 50 | Player B |
| | 45 | Player B |

US 7,794,321 B2

VIDEO GAME PROCESSING APPARATUS, VIDEO GAME PROCESSING METHOD AND VIDEO GAME PROCESSING PROGRAM

CROSS REFERENCE TO RELATED APPLICATION

This application is based upon and claims the benefit of priority from prior Japanese Patent Application No. 2007-310127 filed on Nov. 30, 2007, the entire contents of which are incorporated herein by reference.

BACKGROUND OF THE INVENTION

1. Field of the Invention

The present invention relates to a technology for controlling progress of video game.

2. Related Art

In conventional technology, there had already been proposed various network game capable of carrying out competition between a character operated by own player and a competing (target) character operated by another player by means of communication network. In a certain case of such game, when the own player wins the other player, the own player may get an item possessed by the other player, or in another case, data of a certain character is reflected to data of the other character, such as disclosed in Japanese Patent Application Laid-open (KOKAI) Publication No. 2002-78971 (Patent Document 1).

This Patent Document 1 discloses that capability value and/or knowledge information of a certain character is transmitted to another character.

As mentioned above, although conventional technology provides various communication competition game in which one player competes a competing character operated by the other player through communication network, it has been required to develop a game by which both the competing players gave merits and are interested in the communication competition game.

SUMMARY OF THE INVENTION

The present invention was conceived in consideration of the circumstances mentioned above and an object of the present invention is to provide a technology capable of imparting merits to both the players competing with each other and improving interest in the game for the players.

This and other object can be achieved according to the present invention by providing, in one aspect, a video game processing apparatus for controlling progress of a video game, comprising:

a sub-game score information memory unit configured to store a sub-game score information generated every player in which a score of higher predetermined number in scores of a sub-game having no relation to a main story in the video game, which is a score used for determining parameter of a character used in the main story, and a player obtaining the score are matched; and a renewing unit configured to renew the sub-game score information of a first player by setting the score of the higher predetermined number in a score set in the sub-game score information of the first player and a score set in a sub-game score information of a second player.

According to this aspect, both the players can enjoy merits and an interest in the game for the players can be improved.

In a preferred embodiment of the above aspect, it may be desired that the renewing unit serves to add the score set in the sub-game score information of the second player to the score set in the sub-game score information of the first player, to remain the score of the higher predetermined number and to clear other scores to thereby renew the sub-game score of the first player.

It may be desired that the renewing unit serves to set the score of the higher predetermined number in the score set in the sub-game score information of the second player and the score set in the sub-game score information of the first player to thereby renew the sub-game score of the second player.

It may be desired that the renewing unit serves to renew the sub-game score information at a time when a competing game between the first player and the second player is ended. The renewing unit may serve to renew only the sub-game score information of a player who won the competing game at a time when the competing game between the first player and the second player is ended.

In another aspect of the present invention, there is also provided a video game processing method for controlling progress of a video game, comprising the steps of:

reading out a sub-game score information generated every player in which a score of higher predetermined number in scores of a sub-game having no relation to a main story in the video game, which is a score used for determining parameter of a character used in the main story, and a player obtaining the score are matched; and renewing a sub-game score information of a first player by setting the score of the higher predetermined number in a score set in the sub-game score information of the first player and a score set in a sub-game score information of a second player.

In a further aspect of the present invention, there is also provided a video game processing program for controlling progress of a video game causing a computer to execute:

reading out a sub-game score information generated every player in which a score of higher predetermined number in scores of a sub-game having no relation to a main story in the video game, which is a score used for determining parameter of a character used in the main story, and a player obtaining the score are matched; and renewing a sub-game score information of a first player by setting the score of the higher predetermined number in a score set in the sub-game score information of the first player and a score set in a sub-game score information of a second player.

According to the above various aspect of the present invention, both the players can enjoy the merits and an interest in the game for the players can be improved.

The nature and further characteristic features will be made clearer from the following descriptions made with reference to the accompanying drawings.

BRIEF DESCRIPTIONS OF THE DRAWINGS

In the accompanying drawings:

FIG. 2 is a table showing examples of mini-game score information of a player A;

FIG. 3 is a table showing an example of parameter information of a summoned beast;

FIG. 5 is a table showing examples of mini-game score information of a player B;

FIG. 6 is a table showing an example of mini-game score information of the player A after the score-mix processing;

FIG. 7 is a table showing an example of mini-game of the player B after the score-mix processing;

DESCRIPTION OF THE PREFERRED EMBODIMENT

Hereunder, a first embodiment of the present invention will be described with reference to the accompanying drawings.

Figure 1:
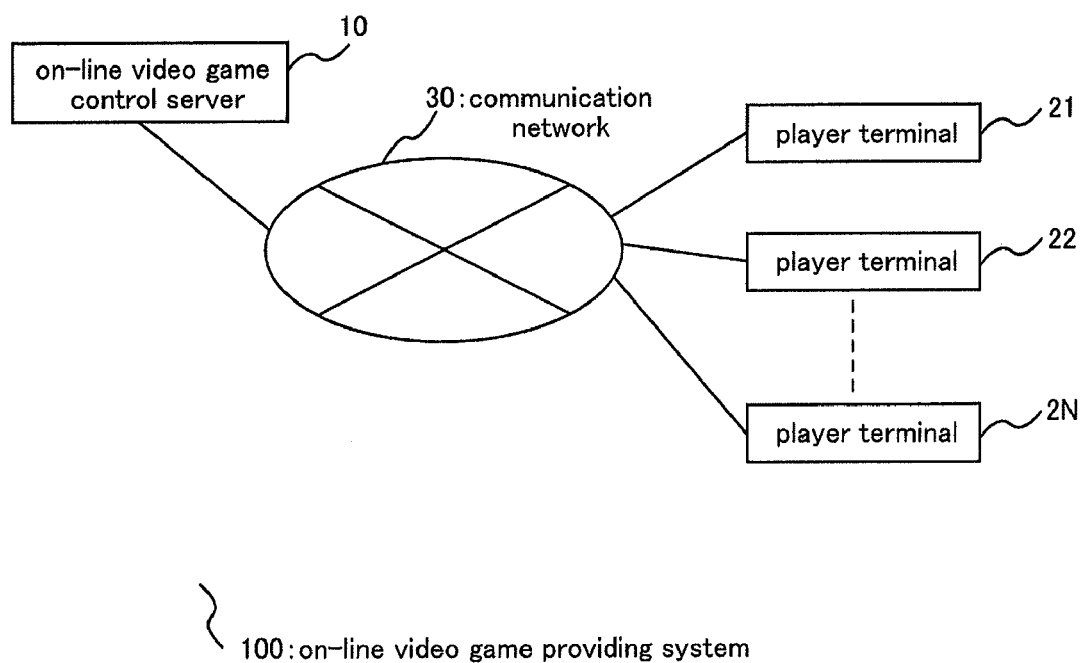
FIG. 1 is a block diagram representing structure of an on-line video game presenting system.

FIG. 1 is a block diagram showing one example of a structure of an on-line video game providing system 100 including an on-line video game control server 10 according to the first embodiment of the present invention. As shown in FIG. 1, the on-line video game providing system 100 includes the on-line video game control server 10 and a plurality of player terminals 21-2N (N: optional positive integer).

The on-line video game control server 10 and a plurality of player terminals 21-2N are connected to communication network 30 such as Internet, respectively.

The on-line video game control server 10 is managed by a system manager of this system 100 and has various functions for providing the on-line video game to the player terminals 21-2N, respectively. In addition, the on-line video game control server 10 has a function for providing a competing game of both characters with respect to a plurality of terminals more than 2 in the player terminals 21-2N. This on-line video game control server 10 is composed of an information processing device such as WWW server.

The player terminals 21-2N are managed respectively by players of the on-line video game, and composed of information processing device such as, for example, commercially sold video game device, portable-type video game device and personal digital assistants. The player terminals 21-2N are provided with hardware and software for the connection to the communication network 30, and also provided, internally or externally, with display units including image displayers composed of television devices and crystal display devices, respectively.

In the present embodiment, it will be assumed that, for example, in a video game such as roll playing game, a main game for progressing a story and a sub-game not directly related to the story of the game (such as a game for performing training such as battle in the main game such as tutorial, a game for obtaining money or item usable for the main game, or like), and in this example, five kinds of mini-games "a" to "e" are prepared as such a sub-game.

FIG. 2 is a view showing a table of an example of mini-game score information as to a player A.

As shown in FIG. 2, the mini-game score information is the information in which the scores of the higher top 3 in the mini-games "a" to "e" correspond to names of players who got such scores.

In this embodiment, it is supposed that, based on the average value of the scores of the higher top 3 of the mini-games "a" to e various kinds of parameters of a predetermined character (herein, summoned beast P) are determined. More specifically, for example, as shown in FIG. 3, a value dividing the average value of the scores of the higher top 3 of the mini-game "a" by 100 is a value representing a parameter "power" of the summoned beast P, a value dividing the average value of the scores of the higher top 3 of the mini-game "b" by 100 is a value representing a parameter "physical power" of the summoned beast P, a value dividing the average value of the scores of the higher top 3 of the mini-game "c" by 100 is a value representing a parameter "quickness" of the summoned beast P, a value dividing the average value of the scores of the higher top 3 of the mini-game "d" by 100 is a value representing a parameter "intelligence" of the summoned beast P, and a value dividing the average value of the scores of the higher top 3 of the mini-game "e" by 100 is a value representing a parameter "spirit" of the summoned beast P. The summoned beast P is a character usable in the main story in the video game (character usable in stand-alone), and may be used for communication competition.

The mini-game score information of the player A is stored in a memory provided for the player terminal 21 managed by the player A, and is displayed on a display screen of a display device provided for the player terminal 21 in accordance with the operation of the player A. In such case, the mini-game score information is displayed, for example, as shown in FIG. 2, so that the scores of the top 3 and the names of the players who gained respective scores with respect to the respective min-games "a" to "e". Further, since all the score that is set as the mini-game score information of the player A is not reflected to the competing player (target), it is preferred that the mini-game score information of the player A is not displayed by the player terminal of the competing player in the competing game.

Next, operation of the on-line video game providing system of the present embodiment will be described.

It is to be noted that, herein, there will be explained a case, in which the on-line video game control server 10 provides a competing game to the player A operating the player terminal 21 and the player B operating the player terminal 22, and for example, after the competing between a summoned beast P1 operated by the player A and a summoned beast P2 operated by the player B, the score of the mini-game score information of the player A and the score of the mini-game score information of the player B are mixed.

Figure 4:
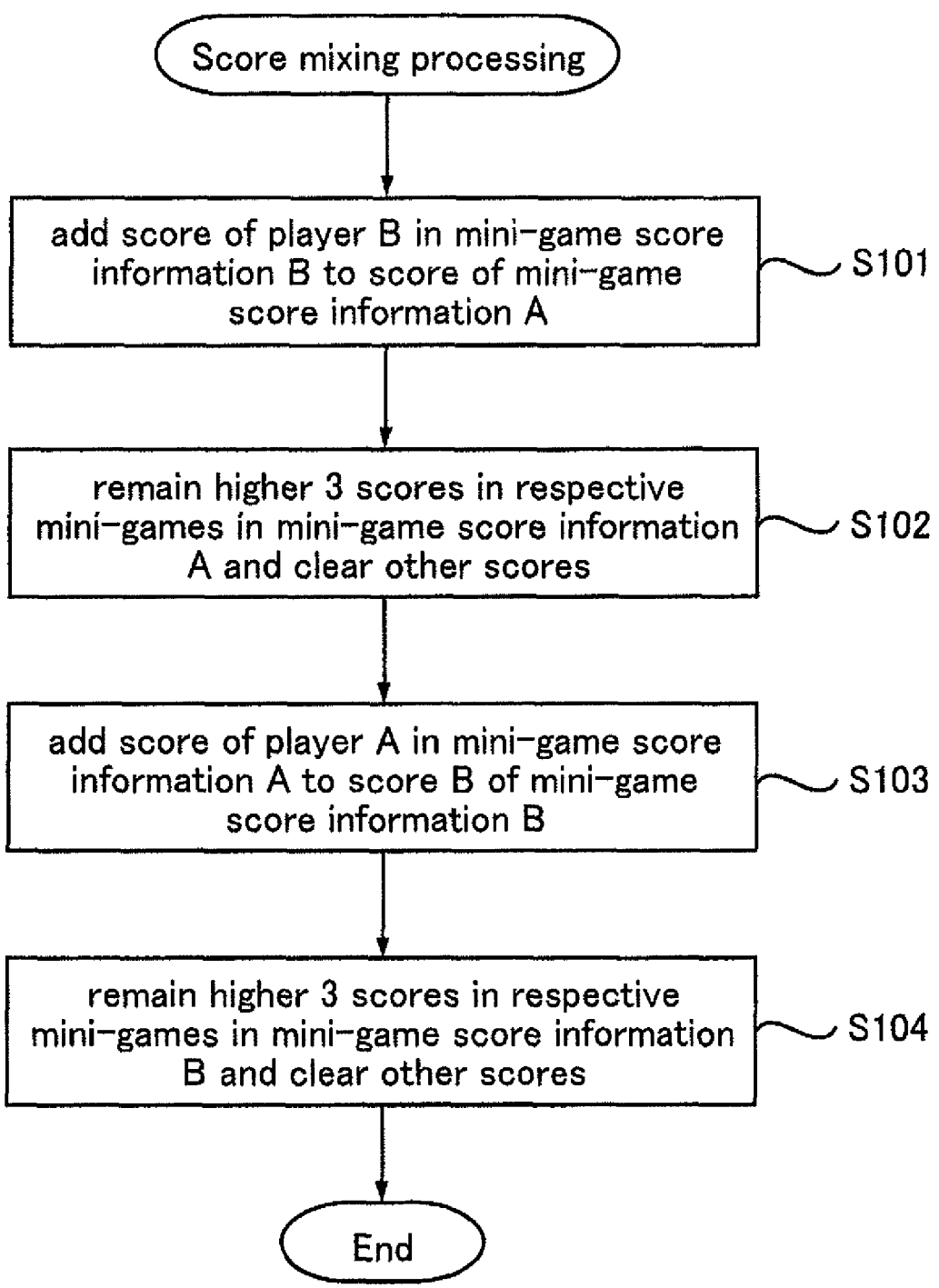
FIG. 4 is a flowchart representing an example of score-mix processing.

FIG. 4 is a flowchart representing a score mix processing executed by the on-line video game control server 10. This score-mix processing is executed after the completion of the competing game. Further, in FIG. 4, explanations of some processes other than those concerning the present invention may be eliminated.

In the score-mix processing, the on-line video game control server 10 serves to add the scores in the respective scores of the mini-games "a" to "e" in the mini-game score information of the player B (herein, mini-game score information shown in FIG. 5, called herein as "mini-game score information B") to the respective scores of the mini-games "a" to "e" of the mini-game score information of the player A (herein, mini-game score information shown in FIG. 2, called herein as "mini-game score information A") (step S101).

More specifically, for example, with respect to the mini-game "b", "145" (player B) in the mini-game "b" in the mini-game score information B is added to ranking of the top 3 of "190" (player A), "155" (player A) and "80" (player A) from the higher score in the mini-game score information A, and hence, from the higher score, there is ranking of the top 4 of "190" (player A), "155" (player A), "145" (player B) and "80" (player A). In this embodiment, a score of a player other than the player B corresponding to the mini-game score information B is not added. That is, there is a possibility that only the score obtained by the competing player itself is added to the mini-game score information B of the player B.

Next, the on-line video game control server 10 serves so that the higher 3 scores in the respective mini-games "a" to "e" remain in the mini-game score information A and the other scores are cleared (step S102).

More specifically, for example, as to the mini-game "b", in the mini-game score information A, according to the processing of the step S101, the higher top 3 scores in the ranking of the top 4 of "190" (player A), "155" (player A), "145" (player B) and "80" (player A) are remained, the last score "80" (player A) is cleared. Accordingly, the scores of the mini-game "b" of the mini-game score information A are higher 3 scores of "190" (player A), "155" (player A), and "145" (player B).

A result, in a case where the scores of the respective mini-games "a" to "e" in the mini-game score information A is mixed with the score of the player B in the scores of the respective mini-games "a" to "e" in the mini-game score information B, is shown in FIG. 6.

Subsequently, the on-line video game control server 10 serves to add the score obtained by the player A in the respective scores of the mini-games "a" to "e" in the mini-game score information A to the respective scores of the mini-games "a" to "e" in the mini-game score information B (step S103).

More specifically, as to the mini-game "b", for example, in the ranking of the higher top 3 of "145" (player B), "120" (player C) and "90" (Player C) in the mini-game score information B, the six scores from the higher score of "190" (player A), "155" (player A) and "80" (player A) in the mini-game "b" in the mini-game score information A are added, and the 6 scores from the higher ones of "190" (player A), "155" (player A), "145" (player B), "120" (player C), "90" (player C) and "80" (player A) are ranked. In this embodiment, scores of players other than those of the player A corresponding to the mini-game score information A are not added.

Next, the on-line video game control server 10 serves to remain the higher 3 scores in the mini-games "a" to "e" in the mini-game score information B and to clear the other scores.

More specifically, for example, as to the mini-game "b", in the mini-game score information B, by the processing of the step S103, the higher 3 scores from the higher 6 scores in the rank of "190" (player A), "155" (player A), "145" (player B), "120" (player C), "90" (player C) and "80" (player A) are remained, and the other scores are cleaned. Thus, the scores of the mini-game "b" in the mini-game score information B are 3 scores of "190" (player A), "155" (player A), "145" (player B) from the higher score value.

The scores of the respective mini-games "a" to "e" in the mini-game score information B are mixed with the scores of the player A in the mini-game "a" to "e", which are shown in FIG. 7.

As mentioned above, the mini-game score information A and the mini-game score information B are mixed together. In the present embodiment, to the respective scores, the names of the players who obtained these scores are matched, respectively, and in the case of score-mixing, the corresponding player name is added or cleared as well as the score.

Figure 8:
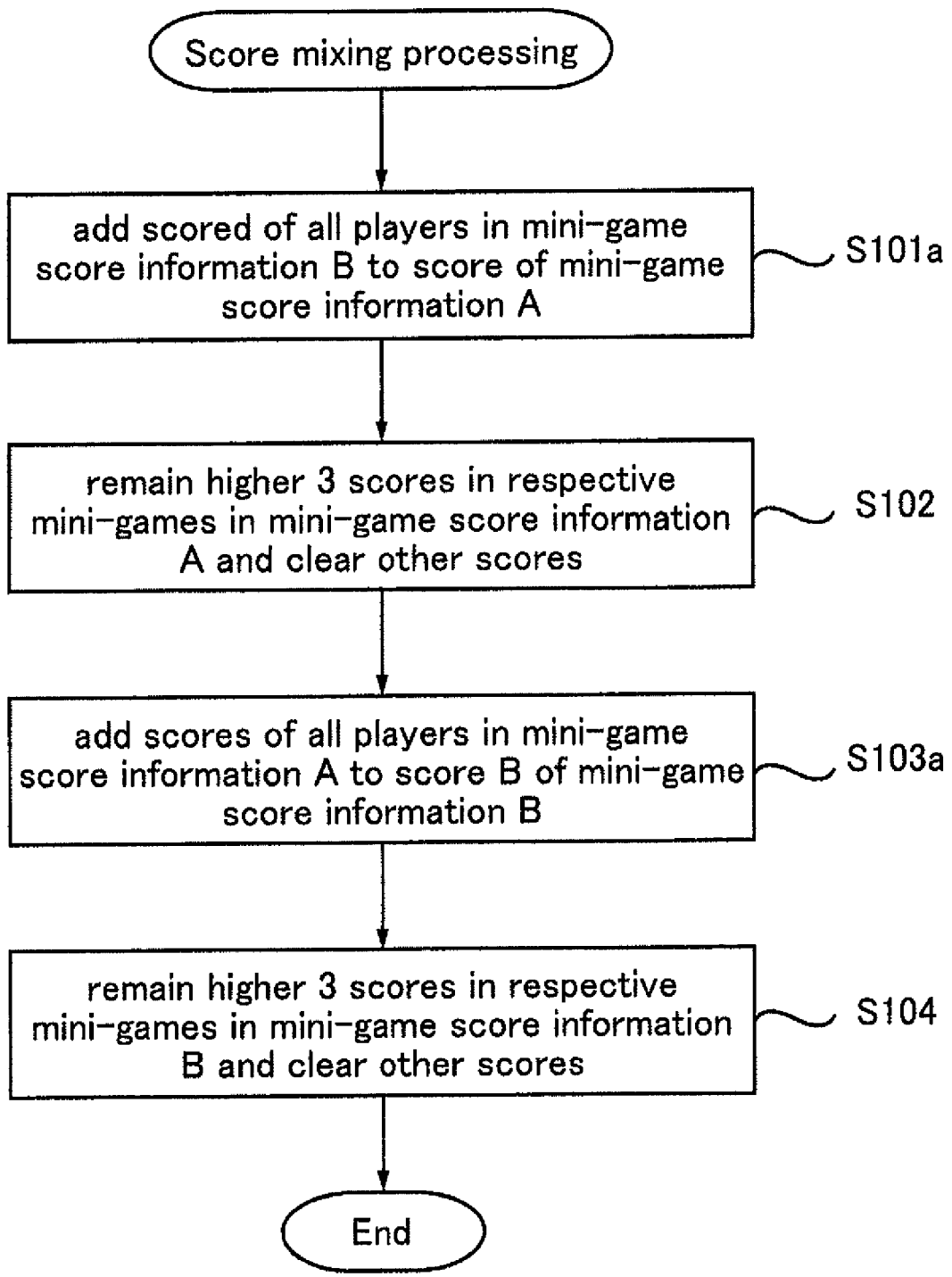
FIG. 8 is a flowchart representing another example of the score-mix processing.

In the above example, although only the score of the player managing the mini-game score information to be mixed is added, scores of all the players may be added. Specifically, as shown in FIG. 8, the on-line video game control server 10 serves to add the respective scores of the mini-games "a" to "e" in the mini-game score information B to the respective scores of the mini-games "a" to "e" in the mini-game score information A (step S101a), and subsequently, the processing of the step S102 is executed. In the like manner, the on-line video game control server 10 serves to add the respective scores of the mini-games "a" to "e" in the mini-game score information A to the respective scores of the mini-games "a" to "e" in the mini-game score information B (step S103a), and subsequently, the processing of the step S104 is executed.

Further, it may be possible to add only the scores matched to the players managing the mini-game score information to be mixed (scores that actually obtained by the competing player). According to such structure, data utilized at a renewal time is only the data obtained by the competing player in the actual play, and as to the scores obtained by the competing player from the other player, the content may be observed, but the score is not obtainable as own ones even if being competed. Therefore, it may constitute a motivation for the competition to the other player who got a high score.

Furthermore, it is judged whether or not there exists a score higher than the lowest score (third score in the above example) in the higher predetermined scores (3 in the above example) after the addition, which is obtained by the player other than the player managing the mini-game score information among the scores registered in the mini-game score information to be mixed. In this judgment, in the case of "YES", it may be permitted to display that score and the player who obtained that score on the display screen of the display device provided for the corresponding player terminal. According to such manner, since it is possible to know the name of the player who obtained the high score, it may be remained as reference for selecting the next competing player. Further, only the name of the player may be displayed without displaying both the obtained score and the player's name.

In the above embodiment, the mini-game score information B is mixed with the mini-game score information A, and also, the mini-game score information A is mixed with the mini-game score information B. However, the score information may be mixed with either one of them. For example, the mini-game score information of the player who lost the game may be mixed only with the mini-game score information of the player who won the game in the competing game.

Figure 9:
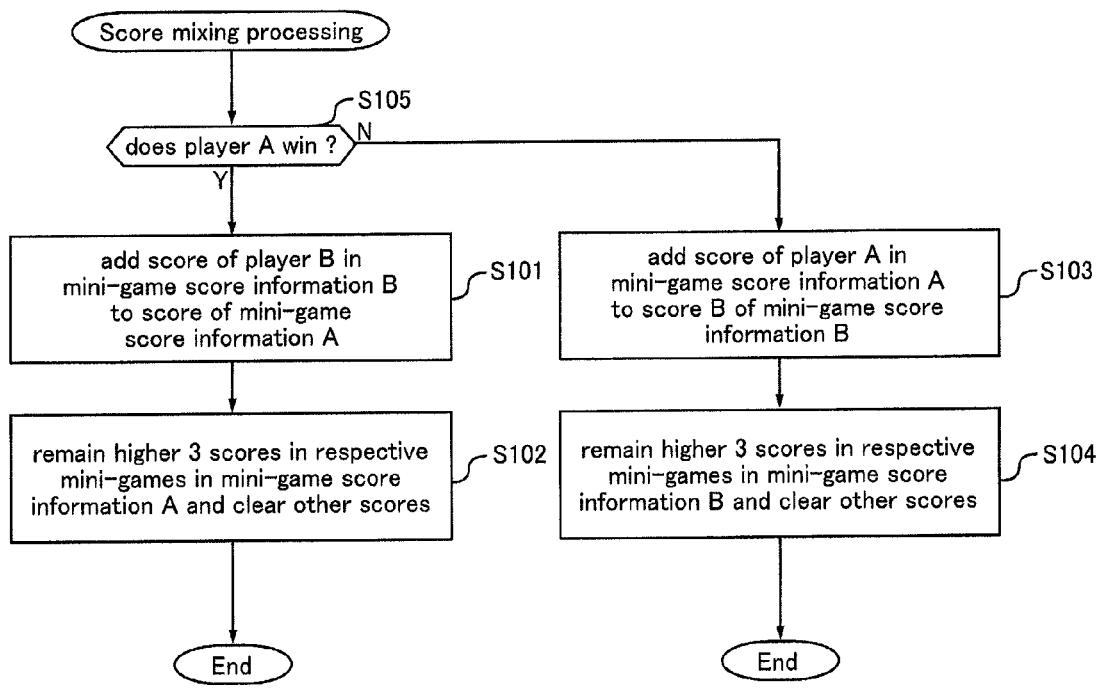
FIG. 9 is a flowchart representing yet another example of the score-mix processing.

More specifically, as shown in FIG. 9, it is judged by the on-line video game control server 10 which player won the competing game (step S105), and in the case that the player A won the competing game, the processings in the steps S101 and S102 are executed, and on the contrary, in the case that the player B won the competing game, the processings in the steps S103 and S104 are executed.

In the above described embodiment, although the on-line video game control server 10 executes the processing concerning the score mixing, it may be permitted for the player terminals 21 and 22 used for the competing game to perform the score mixing processing of the mini-game score informations A and B of the players A and B corresponding to the terminals 21 and 22, respectively. In such case, the player terminal 21 will execute the processings of the steps S101 and S102, and the player terminal 22 will execute the processings of the steps S103 and S104.

Although not specifically referred to in the above, the mini-game score informations A and B may be stored in the database provided for the on-line video game control server 10, or the scores of the corresponding players may be stored in the database provided for the player terminals 21 and 22, respectively. Further, the mini-game score informations A and B may be stored in both the database provided for the on-line video game control server 10 and the database provided for the player terminals 21 and 22, respectively.

In the score-mixing processing in the above examples, the scores after the fourth score are cleared after the addition of one score to the other score. However, any other operating method may be adopted as far as the score of the predetermined number of the higher scores (for example, 3) at the time of the score-mixing remains, and for example, after removing the score after the fourth score from the scores of one player, the score within third score of the scores of the other player may be added.

Furthermore, in the above embodiment, although the game is explained as a network game of server/client system, it may be explained as a communication game through wireless communication between clients. That is, it is the communication game through the wireless communication between the player terminals 21 to 21N, and the processing by the on-line video game control server 10 may be executed by the player terminals 21 to 2N, respectively. More specifically, for example, in the process shown in FIG. 4, the transfer of the necessary information such as mini-game score informations A and B is performed through wireless communication between the player terminal 21 and the player terminal 22, the process corresponding to the steps S101 and S102 is executed by the player terminal 21, and the process corresponding to the steps S103 and S104 is executed by the player terminal 22.

As mentioned hereinabove, the video game processing device (including the on-line video game control server 10, the player terminals 21 to 2N) controlling the progress of the video game has the structure for reading out, from a memory medium provided for itself, for example, the score usable for deciding the parameter of the character (summoned beast P) used in the main story as the score of the higher predetermined number (3 in this embodiment) in the scores of the sub-game not related to the main story of the video game, and the sub-game score information (mini-game score information) generated by every player, which is matched with the player obtaining that score, and renewing the sub-game score information of the first player by setting the higher predetermined number of scores among the score set to the sub-game score information (mini-game score information A) of the first player (player A) and the score set to the sub-game score information (mini-game score information B) of the second player (player B). Therefore, controlling a video game become possible so that merits are given to both the players and the interest of the players in the game can be improved.

That is, by mixing the mini-game score information B of the player B with the mini-game score information A of the player A, the higher score in the mini-game score information A for the player A can be made further higher, thus making high the parameter of the summoned beast P, and on the other hand, for the player B, the self player name is placed on the mini-game score information A of the player A, so that, by making publishable the mini-game score information through the communication network 30, true power of the player B can be appealed to the other player, thus being advantageous, and giving merits to both the players.

In addition, according to the embodiment mentioned above, the video game processing device (including the on-line video game control server 10 and the player terminals 21 to 2N) serves to add the score set in the sub-game score information of the second player B to the score set in the sub-game score information of the first player A and to renew the sub-game score information of the first player A by clearing the other scores than the higher predetermined number of scores, so that the sub-game score information is renewed by the simple operating processing.

Furthermore, the embodiment mentioned above has the structure for renewing the sub-game score information of the second player by setting the higher predetermined number of scores among the score set to the sub-game score information of the second player and the score set to the sub-game score information of the first player. Accordingly, merits can be given to both the players and the interest in the game for the players can be improved. In this case, the parameter of the summoned beast can be made higher for both the players, and therefore, the own player name can be placed on the mini-game score information of the competing player, thus providing merit, and the interest in the game can be further improved for the players.

Furthermore, according to the embodiment described above, the video game processing device (including the on-line video game control server 10 and the player terminals 21 to 2N) serves to renew the sub-game score information at the time of ending the competing game between the first and second players, so that merit can be given to both the players performing the communication competing game and the interest in the game can be improved.

Still furthermore, in the embodiment described above, in the case where the video game processing device (including the on-line video game control server 10 and the player terminals 21 to 2N) serves to renew only the sub-game score information of the player who won the competing game, the player who got the competing game can make the higher score of the mini-game score information further higher, so that the parameter of the summoned beast can be also made higher, thus being advantageous, and for the player who lost the game, the own player name can be placed on the mini-game score information of the competing player, thus also being advantageous.

Still furthermore, in the embodiment mentioned above, at the time of the score mixing, in the structure in which only the score of the competing player can be added, the data of the competing player becomes usable in the stand-alone type game as the data of the self character, and the data exchanging between that player and the competing player is enabled. Therefore, for example, supposing that the mini-game score information is published on the communication network with the player name, it becomes possible to give timing of performing the communication competing game for many players so as to realize the communication competing game with the player having high score.

In addition, in the case of the communication using the communication system such as Wi-Fi, in the case where there had already existed a friend registered in his own friend list in the competing players having high scores, the data (score and the player name) may be displayed on the own sub-list. Further, by selecting the player name displayed on this sub-list, it may become possible to offer the competing to the selected player.

Further, although not mentioned in the above embodiment, the video game processing device (including the on-line video game control server 10 and the player terminals 21 to 2N) serves to execute the various processing mentioned above in accordance with the control program (video game processing program) stored in its own database.

According to the invention of the embodiment of the characters mentioned hereinbefore, both the competing players can be provided with merits and the interest in the game for the players can be improved, thus being convenient and advantageous.

What is claimed is:

1. A video game processing apparatus for controlling progress of a video game, comprising:
   a sub-game score information memory configured to store sub-game score information generated for every player that includes a score of a higher predetermined number of scores of a sub-game having no relation to a main story in the video game, the score being used for determining a parameter of a character used in the main story, a player obtaining the score matched with the score; and an updater configured to update the sub-game score information of a first player by setting the score of the higher predetermined number in a score set in the sub-game score information of the first player and a score of a second player set in a sub-game score information of a second player.

2. The video game processing apparatus according to claim 1, wherein
the updater is configured to add the score set in the sub-game score information of the second player to the score set in the sub-game score information of the first player to maintain the score of the higher predetermined number and to clear other scores to thereby update the sub-game score of the first player.

3. The video game processing apparatus according to claim 1, wherein
the updater is configured to set the score of the higher predetermined number in the score set in the sub-game score information of the second player and the score of the first player set in the sub-game score information of the first player to thereby update the sub-game score of the second player.

4. The video game processing apparatus according to claim 1, wherein
the updater is configured to update the sub-game score information at a time when a game of competition between the first player and the second player is has ended.

5. The video game processing apparatus according to claim 4, wherein
the updater is configured to update only the sub-game score information of a player who won the game of competition at a time when the game of competition between the first player and the second player has ended.

* * * * *